| United States Patent [19] | [11] Patent Number: 4,904,573 |
| --- | --- |
| Hara | [45] Date of Patent: Feb. 27, 1990 |

[54] METHOD FOR FORMING A COLOR IMAGE AND IMAGE FORMING APPARATUS THEREFOR

[75] Inventor: Hiroshi Hara, Kanagawa, Japan

[73] Assignee: Fuji Photo Film Co., Ltd., Kanagawa, Japan

[21] Appl. No.: 269,404

[22] Filed: Nov. 10, 1988

[30] Foreign Application Priority Data

Nov. 11, 1987 [JP] Japan ................................ 62-283151
Dec. 1, 1987 [JP] Japan ................................ 62-304167

[51] Int. Cl.$^4$ ............................................. G03C 7/00
[52] U.S. Cl. ..................................... 430/351; 430/30; 430/203; 430/353; 430/357; 430/394
[58] Field of Search ............... 430/203, 351, 353, 394, 430/30, 357

[56] References Cited

U.S. PATENT DOCUMENTS 4,760,426  7/1988  Taniguchi et al. .................. 430/203
4,820,622  4/1989  Hirai ..................................... 430/351

FOREIGN PATENT DOCUMENTS 1244734  9/1971  United Kingdom .
1274365  5/1972  United Kingdom .
1308925  3/1973  United Kingdom .
2110419  6/1983  United Kingdom .

*Primary Examiner*—Paul R. Michl
*Assistant Examiner*—Janet C. Baxter
*Attorney, Agent, or Firm*—Sughrue, Mion, Zinn, Macpeak & Seas

[57] ABSTRACT

A method for forming an image by the steps of:
(a) imagewise exposing a heat-developable color light-sensitive material;
(b) uniformly exposing at least a portion of the heat-developable light-sensitive material; and
(c) heat developing the imagewise exposed and uniformly exposed heat-developable light-sensitive material to form a color image.

The present invention also includes an apparatus for forming an image on a heat-developable color light-sensitive material by imagewise exposing the material, uniformly exposing at least a portion of the material, and developing the uniformly exposed and imagewise exposed material by application of heat to form a color image, the apparatus comprising:

imagewise exposure means for imagewise exposing the heat-developable positive color light-sensitive material;

uniform exposure means for uniformly exposing at least a portion of the heat-developable light-sensitive material;

transferring means for superposing an image-receiving sheet member onto the imagewise exposed and uniformly exposed heat-developable color light-sensitive material; and heating means for heating the superposed heat-developable light-sensitive material and the image-receiving sheet member, to develop a color image and transfer the image from the heat-developable light-sensitive material to the image-receiving sheet member.

According to the invention, heat-developable materials can be used to reproduce originals having various gradations, or continuous-tone and on-off originals, simply and quickly.

16 Claims, 4 Drawing Sheets

METHOD FOR FORMING A COLOR IMAGE AND IMAGE FORMING APPARATUS THEREFOR

FIELD OF THE INVENTION

This invention relates to a color image forming process and an apparatus for the process. More specifically, the invention relates to a color image forming process capable of changing the gradation of heat developable color photographic materials and an apparatus for the process.

BACKGROUND OF THE INVENTION

Various heat-developable color photographic materials are known, including a positive type heat-developable color photographic material capable of providing positive or negative images when the original is a positive or negative image, respectively.

These include a system using a dye developing agent and a surface latent image type silver halide emulsion described in JP-A-59-165054 (the term "JP-A" as used herein means an "unexamined published Japanese patent application"); a system using a dye-providing compound which has a reducing property and becomes non-releasable of the dye when it reacts with a silver halide at heating, and a surface latent image type silver halide emulsion described in U.S. Pat. No. 4,503,137; a system using a dye-providing compound releasing a diffusible dye by a remaining reducing agent counter-corresponding to the development of silver halide and a surface latent image type silver halide emulsion, described in U.S. Pat. No. 4,559,290, European Pat. No. 220,746A2, and Kokai Giho 87-6199; and a system using a dye-providing compound releasing or forming a dye corresponding to the development of silver halide and an internal latent image type silver halide emulsion, and reversing at processing with a nucleating agent or light described in JP-A-61-107243, JP-A-62-69265, and JP-A-61-159643.

Such positive type heat developable color photographic materials can be used for various purposes such as the reproduction of black-and-white or color transmission or reflective originals, photographing people or scenes, making computer graphic images such as computer animations and computer art, making medical images for, e.g., a CCD endoscope, a microscope, NMR image diagnosis, supersonic image diagnosis, and making images in the printing field, such as camera-ready art and proofs.

Image-forming processes providing images having good quality using these materials include a process of imagewise forming or releasing diffusible dyes from dye-providing compounds with heat development, and transferring the diffusible dyes onto a dye-fixing element containing a mordant by a solvent such as water, a process of transferring these dyes by a high-boiling organic solvent, a process of transferring these dyes onto a dye-fixing element by a hydrophilic solvent contained in the dye-fixing element, and a process of transferring the dyes onto a dye-fixing element such as a support. In these processes negative dye images or positive dye images from the same original can be desirably obtained by changing the dye-providing compounds or the silver halide emulsions used as described, for example, in U.S. Pat. Nos. 4,463,079, 4,474,867, 4,478,927, 4,507,380, 4,500,626, and 4,483,914, JP-A-58-149046, JP-A-58-149047, JP-A-59-152440, JP-A-59-154445, JP-A-59-165054, JP-A-59-180548, JP-A-59-168439, JP-A-59-174832, JP-A-59-174833, JP-A-59-174834, JP-A-59-174635, and JP-A-61-23245, and EP-A2-210,660 and EP-A2-220,746.

In particular, it has recently been investigated to utilize such a diffusion transfer type heat-developable color photographic material for portrait-containing booklets such as passports and bankbooks. Also, it has further been investigated to use the color photographic material for portrait identity cards (ID cards). These booklets or cards are required t have, in addition to portraits, the names, nationalities, sexes, dates of birth as well as letters, signs and bar codes, of information. In this case, portraits are images of continuous tone and letters, signs, bar bodes, are images of discontinuous tone, i.e., "on-off" images. However, when these continuous tone images and on-off images are exposed on the same heat-developable color photographic material under the same image exposure conditions, one of the continuous tone images and the on-off images formed does not have the image quality required. Accordingly, it is necessary to separately expose for the continuous tone images and the on-off images, which results in increased total processing time and complicated exposure means.

Since these various originals each has its own gradation, it is difficult to attain reproduction faithful to various original images using one kind of positive type heat developable color photographic material. That is, when a positive type heat developable color photographic material used has a hard gradation, it is difficult to reproduce images faithful to an original having soft tone, and when a positive type heat developable color photographic material having soft tone is used, it is difficult to reproduce images faithful to an original having hard tone. Accordingly, for reproduction faithful to a desired original, it is necessary to select a positive type heat developable color photographic material suitable for the gradation of the original, whenever the original is changed.

In the field of conventional silver halide photographic materials which are subjected to wet processing using a developer at about normal temperature, in the case of printing images onto a black-and-white photographic paper from a color negative, a weak overall exposure can be applied to the black-and-white photographic paper before image exposure for softening the gradation of the toe portion (low density portion). However, in the case of color photographic materials, this method of softening gradation by overall exposure is little employed owing to technical difficulties such as the number of processing solutions, and the difficulty of color balance control of three colors.

Also, a process is known of obtaining positive images by imagewise exposing a photographic material using internal latent image type silver halide emulsions and then applying an overall exposure in a state that the development does not substantially proceed. In this process, images are reversed by the overall exposure and the overall exposure is a very large power of gradation change. This system can be realized when the development is performed using a long development bath since in such a case, the overall exposure can be applied for a sufficient time. When the development is performed for a short period of time (in particular, within one minute to 30 seconds), the development starts simultaneously with the immersion of a photographic material in the developer and, thereby, overall exposure in the state that the development does not substantially occur is not possible, which makes it difficult to obtain reversal. In particular, reversal by this system is considered to be more difficult for a heat-developable light-sensitive material which is quickly developed without using a processing solution.

Furthermore, JP-A-58-60739 proposes a system of changing the gradation of reversal images by controlling the amount of light for the overall exposure for the reversal but since the overall exposure for reversal also acts as the exposure for controlling the gradation in the system, there is a problem that the tone reproducibility of positive images is poor.

SUMMARY OF THE INVENTION

An object of this invention is to provide an image-forming process capable of simply and quickly obtaining images and an image-forming apparatus for the process.

Another object of this invention is to provide an image-forming process capable of reproducing images of originals having various gradations, using one photographic light-sensitive material and an image-forming apparatus for the process.

A further object of this invention is to provide an image-forming process capable of forming good images of both the continuous tone originals and on-off originals on the same heat-developable color photographic material.

It has now been found that these and other objects can be attained by a method for forming an image by the steps of:

(a) imagewise exposing a heat-developable color light-sensitive material;

(b) uniformly exposing at least a portion of the heat-developable light-sensitive material; and (c) heat developing the imagewise expose uniformly exposed heat-developable light-sensitive material to form a color image.

The present invention also includes an apparatus for forming an image on a heat-developable color light-sensitive material by imagewise exposing the material, uniformly exposing at least a portion of the material, and developing the uniformly exposed and imagewise exposed material by application of heat to form a color image, the apparatus comprising:

imagewise exposure means for imagewise exposing the heat-developable color light-sensitive material;

uniform exposure means for uniformly exposing at least a portion of the heat-developable light-sensitive material;

transferring means for superposing an image-receiving sheet member onto the imagewise exposed and uniformly exposed heat-developable color light-sensitive material; and heating means for heating the superposed heat-developable light-sensitive material and the image-receiving sheet member, to develop a color image and transfer the image from the heat-developable light-sensitive material to the image-receiving sheet member.

DETAILED DESCRIPTION OF THE INVENTION

Figure 1:
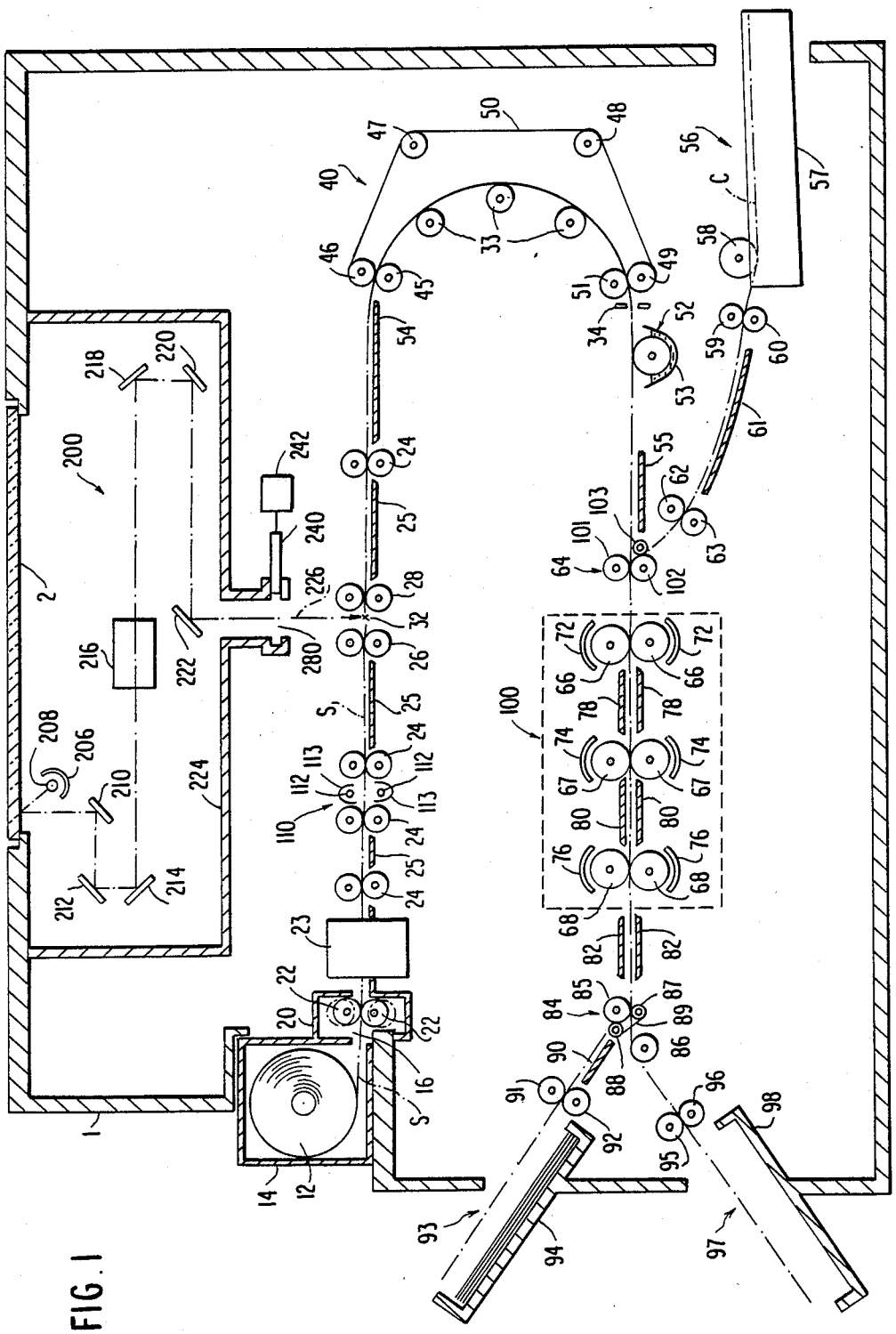
FIG. 1 is a cross-sectional view showing an embodiment of the duplicating apparatus of this invention.

In this invention, the gradation of positive color images can be changed to improve image reproducibility by applying overall exposure to a heat-developable color photographic material.

Also, in this invention, since the overall exposure for the tone change of gradation can be made separately from the step of heat development, the tone of the gradation can be changed without losing the quick processing of heat development.

The extent of the tone change of gradation can be controlled by controlling the exposure amount (i.e., the intensity and the time of light exposure) at the overall exposure.

The invention includes an image-forming process including a step of exposing continuous tone images and discontinuous tone images on the same frame of a heat-developable color photographic material and a step of heat-developing it, wherein an overall exposure is applied to the continuous tone image exposure zone of the heat-developable color photographic material before, during, or after the image exposure.

The exposure amount E is the product of an exposure intensity I and an exposure time t, $$E = I \times t.$$

If an exposure amount for the image exposure is Eo, the exposure amount for the tone change of gradation is preferably in the range of from $1/300 \times E_o$ to $1/10 \times E_o$, and particularly from $1/200 \times E_o$ to $1/15 \times E_o$.

Also, if an image exposure time is $t_o$, the exposure time t for the tone change of gradation is preferably in the range of from $1/100 \times t_o$ to $100 \times t_o$, and preferably from $1/10 \times t_o$ to $100 \times t_o$.

Also, the overall exposure may be applied in two separate exposures or may be two or more intermittent exposures. In this case, if the exposure times and the illuminances are $t_1, t_2, \ldots$ and $I_1, I_2, \ldots$, respectively, the total exposure amount is $$E = \sum_{i=1}^{n} (t_i I_i).$$

The heat-developable light-sensitive material has layer(s) containing a light-sensitive silver halide, a binder, a dye-providing compound, and a reducing agent (the dye-providing compounds can also act as the reducing agent) on a support. If necessary, the light-sensitive layer may further contain additives such as an organic silver salt.

When a heat-developable color photographic material has plural light-sensitive layers, the overall exposure may be applied on one layer only or the plural layers.

For example, when a heat-developable color photographic is composed of light-sensitive layers having color sensitivity to red light, green light, and blue light, respectively, the layers are usually a cyan dye image-forming layer, a magenta dye image-forming layer, and a yellow dye image-forming layer. In this case, when the tone of the magenta dye images only is softened, green light may be used for the tone change of gradation and further red light and blue light may be used for the cyan dye images and yellow dye images, respectively.

That is, according to this system, the gradation of an optional dye image can be controlled.

The overall exposure may be performed before the image exposure, during the image exposure (i.e., simultaneously with the image exposure), or after the image exposure.

In the case of applying the overall exposure during the image exposure, the light source for the overall exposure may be the same one as the light source used for the image exposure or may be another one. When the overall exposure is performed after the image exposure, it is performed before the initation of the heat development.

Furthermore, as the light source for the overall exposure, visible light is used, and examples thereof are a tungsten lamp, a mercury lamp, a halogen lamp (e.g., iodine lamp), and a xenon lamp. Also, as the overall exposure system, an overall simultaneous exposure system and a slit exposure system can be used.

Systems of transferring diffusible dyes include a system of transferring the dyes onto an image-receiving material by an aqueous solvent such as water; a system of transferring dyes onto an image-receiving material by a high-boiling organic solvent; a system of transferring dyes onto an image-receiving material by a hydrophilic heat solvent; and a system of transferring dyes onto an image-receiving material having a dye-receptive polymer utilizing the heat diffusibility or the sublimability of the diffusible dyes.

Specific examples of the heat-developable photographic materials and image-receiving materials for use in this invention are described, for example, in U.S. Pat. Nos. 4,463,079, 4,474,867, 4,478,927, 4,507,380, 4,500,626, and 4,483,914, JP-A-58-149046, JP-A-58-149047, JP-A-59-152440, JP-A-59-154445, JP-A-59-165054, JP-A-59-180548, JP-A-59-168439, JP-A-59-174832, JP-A-59-174833, JP-A-59-174834, JP-A-59-174835, JP-A-62-65038, and JP-A-61-23234, EP-A2-210,660 and EP-A2-220,746.

The present invention is especially perferred in the case of using for a positive working heat-developable light-sensitive material having the construction as described below.

The positive working heat-developable light-sensitive material suitable for this invention contains surface latent image type silver halide emulsion(s) and dye-providing compound(s) releasing a diffusible dye by being reduced with a reducing agent remaining without being oxidized after developing the silver halide by the reducing agent, or a precursor thereof present at development. The positive working heat-developable color photographic material of this type has the advantage that the tone changing effect of gradation by the overall exposure in this invention has good reproducibility.

Preferred examples of the dye-providing compound having this function are represented by formula (I):

$$\text{PWR} - (\text{Time})_t - \text{Dye} \quad (I)$$

wherein PWR represents a group capable of releasing (Time)$_t$—Dye upon being reduced; Time represents a group capable of releasing Dye after (Time)$_t$—Dye released from PWR; t is 0 or 1; and Dye represents a dye or a precursor thereof.

PWR may, for example, be a moiety containing an electron accepting center and an intramolecular nucleophilic substitution center in a compound releasing a photographic reagent by nucleophilic substitution reaction in the molecule after being reduced, as disclosed in U.S. Pat. Nos. 4,139,389, 4,139,379 and 4,564,577, JP-A-59-185333, and JP-A-57-84453; or a moiety containing an electron accepting quinoid center and a carbon atom bonding the quinoide center to a photographic reagent in a compound capable of releasing the photographic reagent by an electron transferring reaction in the molecule after being reduced, as disclosed in U.S. Pat. No. 4,232,107, JP-A-59-101649 and JP-A-61-88257, and Research Disclosure, No. 24025, IV (1984). Also, PWR may be a moiety containing an aryl group substituted by an electron attactive group and an atom (sulfur atom, carbon atom, or nitrogen atom) bonding the aryl group to a photographic reagent in a compound capable of releasing the photographic reagent by the cleavage of a single bond after being reduced, as disclosed in West German Patent Application (OLS) 3,008,588, JP-A-56-142530 and U.S. Pat. Nos. 4,343,893 and 4,619,884. Furthermore, PWR may be a moiety containing a nitro group and a carbon atom bonding the nitro group to a photographic reagent in a nitro compound capable of releasing the photographic reagent after receiving electron, as disclosed in U.S. Pat. No. 4,450,223; or a moiety containing a dieminal dinitro group and a carbon atom bonding the group to a photographic reagent in a dinitro compound capable of $\beta$-releasing the photographic reagent after accepting an electron as disclosed in U.S. Pat. No. 4,609,610.

Preferred examples of the compound shown by formula (I) describe above include compouds having an N—X bond (wherein X represents oxygen atom, nitrogen atom, or sulfur atom) and an electron attractive group in one molecule described in EP-A2-330,746, Kokai Giho 87-6199, JP-A-62-244048, JP-A-63-201653, and JP-A-63-201654; compounds having an SO$_2$—X bond (wherein X is same as described above) and an electron attractive group in one molecule described in Japanese Patent Application No. 62-106885 (USSN 07/188,779); compounds having a C—X' bond (wherein X' is same as X described above or represents —SO$_2$—) and an electron attractive group in one molecule described in Japanese Patent Application No. 62-106887 (USSN 07/189,269); and the compound having

(wherein X is same as described above) and an electron attractive group in one molecule described in Japanese Patent Application No. 62-106895. In these compounds, the N—X bond type compounds are particularly preferred.

Practical examples and method of using these dye-providing compounds are described in detail in the above patents and patent applications, and they can be used in this invention based on the descriptions thereof.

The surface latent image type silver halide which is used in a preferred embodiment of this invention may be silver chloride, silver bromide, silver iodobromide, silver chlorobromide, silver chloroiodide, or silver chloroiodobromide.

The silver halide emulsion for use in this invention may be a mono-disperse emulsion or a poly-disperse emulsion, or a mixture of plural mono-disperse emulsions may be used. The grain sizes of the silver halide grains for use in this invention are from 0.1 to 2 $\mu$m, and particularly preferably from 0.2 to 1.5 $\mu$m. The crystal habit of the silver halide grains may be cubic, octahedral, tetradecahedral, or tabular of high aspect ratio.

The silver halide emulsions described in U.S. Pat. Nos. 4,500,626 and 4,628,021, Research Disclosure (RD 17029), pages 9 to 10 (June, 1978), JP-A-60-196748, JP-A-60-192937, and JP-A-60-258535 can be used in this invention.

The silver halide emulsion can be used as a primitive emulsion but is usually chemically sensitized. For the chemical sensitization, a sulfur sensitization, a reduction sensitization, and a noble metal sensitization which are usually applied to ordinary silver halide emulsions can be used singly or as a combination thereof. These chemical sensitizations can be performed in the presence of a nitrogen-containing heterocyclic compound (JP-A-58-126526 and JP-A-58-215644).

The coating amount of the light-sensitive silver halide for use in this invention is in the range of from 1 mg/m$^2$ to 10 g/m$^2$ as silver.

In this invention, an organic metal salt can be used as an oxidizing agent together with the light-sensitive silver halide, and of these organic metal salts, an organic silver salt is particularly preferably used. As the organic compounds capable of being used for forming these organic silver salt oxidizing agents, there are the compounds described in U.S. Pat. No. 4,500,626, such as benzotriazoles and fatty acids. Also, there are a silver salt of a carboxylic acid having an alkynyl group such as silver phenylpropionate described in JP-A-60-113235 and acetylene silver described in JP-A-61-249044. The organic silver salts may be used singly or as a combination thereof.

The organic silver salt described above is used in the range of from 0.01 mol to 10 mols, and preferably from 0.01 mol to 1 mol per mol of light-sensitive silver halide. The sum of the coating amounts of the light-sensitive silver halide and the organic silver salt is suitably from 50 mg/m$^2$ to 10 g/m$^2$ as silver.

The silver halide emulsion for use in this invention may be spectrally sensitized by methine dyes. Examples of the dyes which are used for the spectral sensitization are cyanine dyes, merocyanine dyes, complex cyanine dyes, complex merocyanine dyes, holopolar cyanine dyes, hemicyanine dyes, styryl dyes, and hemioxonole dyes.

Examples of these dyes are the sensitizing dyes described in JP-A-59-180550 and JP-A-60-140335, Research Disclosure, (RD 17029), pages 12 to 13 (June 1978), and the heat-discoloring sensitizing dyes described in JP-A-60-111239 and JP-A-62-32445.

These sensitizing dyes may be used singly or as a combination thereof and a combination of sensitizing dyes is frequently used for the purpose of supersensitization.

As the binder for the heat-developable color photographic material which is used in this invention, hydrophilic binders are preferably used. As the hydrophilic binders, transparent or translucent binders are preferred and examples thereof are proteins such as gelatin and gelatin derivatives; cellulose derivatives; polysaccharides such as starch and gum arabic; and water-soluble vinyl polymers such as polyvinyl alcohol, polyvinylpyrrolidone, a partial saponification product of a copolymer of vinyl alcohol and acrylic acid, and an acrylamide polymer. These binders may be used singly or as a combination thereof. Furthermore, in addition to the binder, a dispersed vinyl compound can be used for improving the dimensional stability of the photographic material.

In this invention, the coating amount of the binder is preferably less than 20 g/m$^2$, more preferably less than 10 g/m$^2$, and particularly preferably less than 7 g/m$^2$.

For the heat-developable color photographic materials which are used in this invention, a reducing agent or a precursor therefor which are known in the field of heat-developable light-sensitive materials can be used. Also, these materials include dye-providing materials having a reducing property as described hereinafter (in this case, other reducing agents can be used in combination). Furthermore, a reducing agent precursor which does not have a reducing property by itself but shows a reducing property by the action of a nucleophilic reagent or heat during development can be used.

Examples of the reducing agent which can be used in this invention are the reducing agents and the precursors therefor described in U.S. Pat. Nos. 4,500,626, 4,483,914, 4,330,617 and 4,590,162; JP-A-60-140335; JP-A-57-40245; JP-A-56-138736; JP-A-60-128438; JP-A-60-128436; JP-A-60-128439; JP-A-60-128347; JP-A-62-131253; JP-A-62-131254; JP-A-62-131255; JP-A-62-131256; and EP-A2-220,746; and the combinations of various reducing agents described in U.S. Pat. No. 3,039,869.

The addition amount of the reducing agent in this invention is from 0.01 mol to 20 mols, and preferably from 0.1 mol to 10 mols per mol of silver.

For obtaining colors of wide range in the chromaticity diagram using three primary colors of yellow, magenta, and cyan, a combination of at least three silver halide emulsion layers each having light-sensitivity for each different spectral region is used. For example, there are a combination of a blue-sensitive layer, a green-sensitive layer, and a red-sensitive layer and a combination of a green-sensitive layer, a red-sensitive layer, and an infrared-sensitive layer. These light-sensitive emulsion layers may be disposed in the order conventional for ordinary color photographic materials. Also, if necessary, each light-sensitive layer may be composed of two or more layers.

In a preferred embodiment of this invention, a dye-fixing element capable of receiving diffusible dye(s) formed in the positive working heat-developable color photographic material is used. The dye-fixing element may be formed on a support different from the heat-developable light-sensitive material or formed on the same support as that of the heat-developable light-sensitive material. The relation of the heat-developable light-sensitive material and the dye-fixing element, the relation of the heat-developable sensitizing dye and the support, and the relation of the heat-developable light-sensitive material and the white reflective layer described in U.S. Pat. No. 4,500,626, can be used in this invention.

The dye-fixing element which is preferably used in this invention has at least one layer containing a mordant and a binder. As the mordant, those known in the field of photography can be used. Practical examples of the mordant which can be used in this invention are described in U.S. Pat. No. 4,500,626; JP-A-61-88256; JP-A-60-118834; JP-A-60-119557; JP-A-60-235134; JP-A-62-244043; and JP-A-62-244036. Also, the dye-receptive high-molecular compounds described in U.S. Pat. No. 4,462,079 may be used as the mordant.

As the binder for the layer(s) constituting the dye-fixing element, natural or synthetic polymers as described above for the heat-developable light-sensitive materials can be used.

For the heat-developable light-sensitive material and/or the dye-fixing element for use in this invention can be used an image-forming accelerator. The dye-forming accelerator has functions of accelerating the oxidation-reduction reaction of a silver salt oxidizing agent and a reducing agent, accelerating reactions such as the formation of dyes from dye-providing materials, the decomposition of dyes, and the release of diffusible dyes, and accelerating the transfer of dyes from the layers of the heat-developable light-sensitive material into the dye-fixing layer. From the physicochemical properties, the image-forming accelerators are classified into bases, base precursors, nucleophilic compounds, high-boiling organic solvents (oils), heat solvents, surface active agents, and compounds having combined action with silver or silver ions. These materials generally have composite functions and the dye-forming accelerator generally has some of the acceleration effects. Details of these accelerators are described in U.S. Pat. No. 4,678,739.

The base precursor includes a salt of an organic acid causing decarboxylation by the action of heat, and a base and a compound releasing an amine by an intramolecular nucleophilic substitution reaction, Lossen rearrangement, or Beckmann transition. Examples thereof are described in U.S. Pat. No. 4,511,493 and JP-A-62-65038. Also, the combination of the sparingly soluble metal compound and a compound capable of causing a complex-forming reaction with the metal ion consisting the sparingly soluble metal compound (hereinafter referred to as a "complex-forming compound") described in EP-A-210,660 and the compound generating a base by electrolysis described in JP-A-61-232451 can be used as the base precursor in this invention. Of these, the former is particularly effective. It is advantageous that the sparingly soluble metal compound and the complex-forming compound are separately incorporated in the heat-developable light-sensitive material and the dye-fixing element.

As the support for the heat-developable light-sensitive material and/or the dye-fixing element in this invention, a material capable of enduring the processing temperature is used and as general supports, there are glass sheets, papers, plastic films and metal sheets, as well as the supports described in JP-A-61-147244.

One embodiment of the image-forming process of this invention includes a step of imagewise exposing the heat-developable color photographic material to an original, a step or supplying water to the aforesaid heat-developable photographic material before or after image exposure, a step of superimposing the heat-developable photographic material on a dye-fixing element so that the light-sensitive layer of the heat-developable photographic material is in contact with the dye-fixing layer of the dye-fixing element, a heating step of heat-developing the heat-developable photographic material to transfer by diffusion the color images imagewise formed into the dye-fixing element, and a step of uniformly applying an overall exposure to the heat-developable photographic material before or during the image exposure step, or after the image exposure step and before the superposing step.

Furthermore, the step of supplying water to the heat-developable light-sensitive material may be performed before or during image exposure, or after the image exposure and before the superposing step.

Typical examples of the steps for the image-forming process of this invention are as follows:

(1) Overall exposure step→water-supplying step→image exposure step→superposing step→heating step (development and transfer).

(2) Overall exposure step→image exposure step→water-supplying step→superposing step→heating step (development and transfer).

(3) Image exposure step→overall exposure step→water-supplying step→superposing step→heating step (development and transfer).

(4) Image exposure step→water-supplying step→overall exposure step→superposing step→heating step (development and transfer).

(5) Image exposure step and overall exposure step (simultaneous)→water-supplying step→superposing step→heating step (development and transfer).

A further embodiment of the image-forming process of this invention includes a step of imagewise exposing the heat-developable color photographic material to an original having a continuous tone image and an on-off image. Also, the heating step may include a pre-heating step of heating the photographic material to an extent substantially not advancing heat development and a heating step substantially advancing the heat development and image transfer.

As the light source for the image exposure step, visible light is used and examples include a tungsten lamp, a mercury lamp, a halogen lamp (e.g., iodine lamp), and a xenon lamp. Also, as an image exposure system, a system for simultaneously exposing the whole surface or a slit exposing system may be employed.

The liquid which is supplied to the heat-developable photographic material in the wetting step includes not only "pure water" but also any ordinary tap water. Also, the water may be mixed solvent of pure water and a low-boiling organic solvent such as methanol, dimethylformamide (DMF), acetone, or diisobutyl ketone. Furthermore, the water may contain an image-forming accelerator, an antifoggant, a development stopping agent, a hydrophilic heat solvent.

It is preferred for obtaining uniform images to supply a definite amount of water to the heat-developable photographic material. If water is applied in a small amount, e.g., less than the maximum swelling amount of the layer(s), image unevenness is liable to form by shedding of water on the surface of the photographic material or the uneven impregnation of water in the layers. Accordingly, a surface active agent may be added to the water to improve spreading of water on the surface of the photographic material.

The amount of the surface active agent differs according to the kind thereof but is preferably an amount of capable reducing the surface tension below 40 dyne/cm.

Also, the water supplied may be heated to a temperature not over the heat developing temperature.

The amount of water in this invention is in at least 0.1 time the amount of the total coated layers of the heat-developable photographic material and the dye-fixing element, preferably from 0.1 time the amount of the total coated layers to the amount of water corresponding to the maximum swelling volume of the total coated layers, and more preferably from 0.1 time the amount of the total coated layers to the amount of water corresponding to the maximum swelling volume of the total coated layers leaving therefrom the amount of the total coated layers.

The layers become unstable upon swelling and according to conditions, there is a possibility of local bleeding. For preventing this it is preferred that the amount of water applied is less than the amount of water corresponding to the maximum swelling amount of the total coated layers of the heat-developable photographic material and the dye-fixing element.

Practically, the amount of water is from 1 g/m$^2$ to 50 g/m$^2$, preferably from 2 g/m$^2$ to 35 g/m$^2$, and more preferably from 3 g/m$^2$ to 25 g/m$^2$.

For supplying water to the heat-developable photographic material in this invention, there are, for example, a roller coating process or a wire bar coating process described in JP-A-58-55907, a process of coating water using a water adsorptive member as described in JP-A-59-181354, a process of applying water by forming a bead of water between the heat-developable light-sensitive material and the dye-fixing element as described in JP-A-59-181346, a process of applying water by forming a bead of water between a water repelling roller and the heat-developable light-sensitive material as described in JP-A-59-181348, a dip coating process, an extrusion coating process, a process of spraying water as jets through fine holes or slits, and a process of applying water in a system of rupturing water-containing pods. In this case, it is preferred to recycle water for reuse.

Water may be applied in a predetermined amount or may be sufficiently applied followed by controlling the amount thereof by squeezing using press rollers or by drying under heating as described in JP-A-59-164551.

The step of supplying water may before or after image exposure, if it is before the heat development.

When the heat-developable photographic material is superposed on the dye-fixing element after supplying water, it is preferred to apply a pressure.

Otherwise, if they are partially superposed, image unevenness which is considered to be caused by the nonuniform distribution of water-insoluble components such as a salt of the complex-forming compound is liable to occur.

The pressure applied at superposing the heat-developable photographic material on the dye-fixing element depends upon the kind of material used, but is generally from 0.1 kg/cm$^2$ to 100 kg/cm$^2$, and preferably from 1 kg/cm$^2$ to 50 kg/cm$^2$ as described, e.g., in JP-A-59-180547.

As the means of applying pressure to the superposed heat-developable photographic material and the dye-fixing element, a system of passing them through a pair of rollers, a system of pressing using plates having good smoothness, can be employed. Also, the press rollers or plates may be heated in the temperature range of from room temperature to the temperature in the heat development step at pressing.

If necessary, the superposing step may be performed under pre-heating. The pre-heating temperature is not over the heat development temperature and is from 35° C. to 95° C., and preferably from 40° C. to 90° C.

As the heating means for the heating step of heating the superposed elements, a means for passing them through hot plates, a means for contacting them with a hot plate, a means for contacting them with a hot drum or a hot roller while rotating it, a means for passing them through a hot atmosphere, can be used.

The heating temperature in the heating step is in the range of from about 50° C. to about 100° C., and preferably from 60° C. to 100° C. Also, a layer of an electrically conductive material such as graphite, carbon black, and metals, can be formed on the heat-developable photographic material and the photographic material may be directly heated by passing an electric current through the layer.

After the heating step described above, a step of peeling off the dye-fixing element from the heat-developable photographic material may be employed, and in this case, an optional peeling means can be used. For example, the means disclosed in JP-A-62-280741 can be used.

Specific embodiments of the image-forming apparatus of this invention for performing the process of this invention are now explained in greater detail with reference to the accompanying drawings, but the present invention is not to be construed as being limited thereto.

FIG. 1 is a schematic sectional view showing an example of the image-forming apparatus of this invention. In addition, in the following description, the heat-developable photographic material is sometimes expressed simply as "light-sensitive material" and the dye-fixing element as "image-receiving paper".

In FIG. 1, a light exposure means 200 is disposed at the upper portion in a housing 1 and the section including the light exposure means 200 is shielded from other section by a partition wall 224.

The light exposure means is composed of an illumination lamp 208 equipped with a reflection mirror 206 scanning the lower portion of a glass platen over the whole plane in a body, mirrors 210, 212, 214, an assembly 216 composed of image focusing lenses and filter unit, mirrors 218 and 220, each moving in the same direct on to ½ of the scanning distance of the lamp, and a fixed mirror 222.

At the portion of the exposure means 200 through which an optical axis 226 passes, an opening is formed and a shutter 240 is formed at the opening 280.

To one side of the housing 1 is removably equipped a cartridge 14 containing a roll 12 having wound thereon a heat-developable photographic sensitive material S (hereinafter, referred to as "light-sensitive material"). At the outlet 16 for the light-sensitive material S of the cartridge 14 are disposed a pair of delivery rollers 22 and 22 contained in a dark box 20 and the light-sensitive material S wound round the roll 12 is delivered to a definite length at a definite time through the rollers 22 and 22. When the leading edge of the light-sensitive material S is delivered into the duplicating apparatus, the delivering rollers 22 and 22 open a part from each other to the positions shown by the imaginary lines to enable the travel of the light-sensitive material S.

In front of the dark box 20 are disposed a cutter unit 23 for cutting the light-sensitive material S, plural feed rollers 24 and plural guide plates 25.

In a transporting passageway for the light-sensitive material S formed by the feed rollers 24 and guide plates 25 is disposed an overall exposure means 110, which uniformly overall-illuminates the light-sensitive material S. In the overall exposure means 110 are exposed a pair of light sources 112 and a pair of reflection mirrors 113 so that the exposure means 110 can illuminate the light-sensitive material S from either of the support side and the light-sensitive layer side.

In front of the overall exposure means 110 are disposed two sets of nip rollers 26 and 28 so that the light-sensitive material S passes through the exposure position by the exposure means 200 and also in front of the nip rollers 28 are disposed guide rollers 24 and guide plates 25.

Furthermore, in front of the nip rollers 28 is disposed a turning means 40 for turning the exposed light-sensitive material S. The turning means 40 is supported by four belt-supporting rollers 46, 47, 48 and 49 and also has an endless belt 50 wound round to form a circular arc of about 180° by means of feed rollers 33 and nip rollers 45 and 51 which are brought into contact with the supporting rollers 46 and 49, respectively, under pressure.

The turning means 40 further has a guide plate 54 for guiding the light-sensitive material S sent through the nip rollers 28 to the nip roller 45 and also in front of the nip roller 51 is disposed of a sensor 34 for detecting the leading edge of the light-sensitive material.

In front of the sensor 34 is disposed a water applying means 52. By the water applying means 52, water in a tank 53 is coated on the light-sensitive layer surface of the light-sensitive material S and the light-sensitive material S coated with water is guided by a guide plate 55 and sent to press rollers 101 and 102 of a superposing means 64 of the photographic material and the image-receiving paper.

An image-receiving paper supplying means 56 is disposed under the turning means 40. The image-receiving paper supplying means 56 is composed of an image-receiving paper supplying cassette 57, a delivering roller 58 for delivering an image-receiving paper in the cassette 57, and feed rollers 59, 60, 62 and 63 for sending the image-receiving paper C delivered by the delivering roller 58 between the press roller 102 and the nip roller 103 along a guide plate 103.

In this case, the aforesaid water-applying means 52 may be disposed in front of the image-receiving paper supplying means 56 and water may be coated on the image-receiving paper.

The width of the image-receiving paper C is about 6 mm shorter than the width of the light-sensitive material S and the image-receiving paper C is superposed on the light-sensitive material S in the superposing means 64 composed of press rollers 101 and 102 so that the image-receiving paper C is in the central portion of the light-sensitive material S.

In front of the superposing means 64 is disposed a heat-developing and image-transferring means 100. In the heat-developing and image-transferring means 100 are disposed a pair of 1st heat rollers 66, a pair of 2nd heat rollers 67, and a pair of 3rd heat rollers 68 at definite intervals.

Also, between the 1st heat rollers 66 and the 2nd heat rollers 67 and between the 2nd heat rollers 67 and the 3rd heat rollers 68 are disposed guide plates 78 and guide plates 80, respectively each with a pass line for the light-sensitive material S and the image-receiving paper C. Also, guide plates 78 and 80 each is equipped with a heater (not shown). The 1st heat rollers 66, the 2nd heat rollers 67, and the 3rd heat rollers 68 are synchronistically rotated by a motor (not shown).

The 1st heat rollers 66, the 2nd heat rollers 67, and the 3rd heat rollers 68 are made of rubber and each is equipped with a driving shaft made of an electrically conductive material. At the outsides of the 1st heat rollers 66, the 2nd heat rollers 67, and the 3rd heat rollers 68 are disposed heaters 72, 74, and 76, respectively along the direction of the shafts of the heat rollers.

Each of the heaters 72, 74, and 76 is equipped with plural heating elements (not shown) along the direction of the shaft of the hat rollers 66, 67 and 68, and each of the heat rollers 66, 67 and 68 can be heated at plural portions.

These heaters 72, 74, and 76 are connected to an electric source (not shown) through a controlling device (not shown).

In front of the heat-developing and image-transferring means 100 is disposed a means 84 for peeling of the image-receiving paper from the light-sensitive material with guide plates 82 between them. The peeling means 84 is composed of a 1st feed roller 85, a 2nd feed roller 86, and a peeling off belts 89 each supported by guide rollers 87 and 88, which press the light-sensitive material S only to the outer face of the 1st feed roller 85 at both end portions of the roller.

Above and side portion of the peeling off means 84 is formed a light-sensitive material discarding portion 93 and below and side portion of the means 84 is formed an image-receiving paper receiving portion 97. The light-sensitive material discarding portion 93 is composed of a guide member 90, a pair of feed rollers 91 and 92, and a discarding box 94 and the light-sensitive material S sent from the peeling off means 84 through the guide member 90 is discarded into the discarding box means of the feed rollers 91 and 92. The image-receiving paper receiving portion 97 is composed of a pair of feed rollers 95 and 96 and a tray 98 for receiving image-receiving paper C, the tray 98 being projected from the housing 1.

The image-forming apparatus (duplicator) is equiped with an illumination lamp 208, a cutter unit 23, a scanning and driving means (not shown) for the light exposure means 200, a sensor 34 for detecting the leading top of the light-sensitive material, a means 64 for superposing th image-receiving paper on the light-sensitive material, and a controlling means (not shown) connected to a solenoid 242 for driving shutter and is operated as follows.

In the operation standby step, i.e., the copying standby step of the duplicating apparatus, the leading top of the light-sensitive material S is near the cutting portion of the cutter unit 23 or in the dark box 20.

Then, when a copy start buttom (not shown) is pushed, the delivery rollers 22 are operated to send the light-sensitive material S and after, if necessary, applying thereto an overall exposure by means of the overall exposure means 110, the illumination lamp 208 is lighted immediately before the leading edge of the light-sensitive material reaches the exposure position 32 to illuminate an original. Also, when the leading end of the light-sensitive material reaches the position 32, the shutter 240 closed until then released by the action of the solenoid 242, the exposure means 200 is operated, and the light-sensitive material S is advanced at a rate corresponding to the working of the exposure means 200. Thus, the image of the original is projected onto the light-sensitive material S to imagewise expose the light-sensitive material. When the light-sensitive material S travels a distance same as the length of the original, the cutter unit 23 acts to cut the light-sensitive material S. Also, at the same time, the shutter 240 is closed to optically shield the inside of the apparatus.

The light-sensitive material S thus imagewise exposed and cut is sent to the turning means 40 and is turned while being pressed onto the feed rollers 33 by the endless belt 50. When the leading edge of the light-sensitive material S is turned, it is detected by the sensor 34 and thereafter, the light-sensitive layer by the water-applying means 52.

In the image-receiving paper supplying means 56, by pushing a copy start buttom or with the start of image exposure, the image-receiving paper C is delivered and when the leading top thereof reaches the position being nipped by the press roller 102 and the nip roller 103, the image-receiving paper C is stopped.

In the means 64 for superposing the image-receiving paper on the light-sensitive material, the image-receiving paper C having narrow width is superposed on the light-sensitive material S of broad width so that the paper is disposed at the central portion in the width direction and the leading top of the paper is at the same position as the leading top of the light-sensitive material or is few millimeters ahead, and the assembly is sent to the heat-developing and image-transferring means 100, wherein the images formed on the light-sensitive material S are transferred onto the image-receiving paper C under heating.

After image transfer, the assembly is sent to the peeling of means 84, in which the light-sensitive material S is peeled off from the image-receiving paper C by the peeling belt 89 and sent to the discarding portion 93. The image-receiving paper C is sent to the receiving tray 98 by the feed rollers 95 and 96.

In this embodiment, in the heat-developing and image-transferring means 100, heating is performed by the heat rollers 66, 67, and 68 but heating may be performed by belt heating, by a thermal head composed of a linear array of heating elements, electric heating, drum heating, microwave heating, or infrared irradiation. Furthermore, the assembly may be heated in a bath containing a heated liquid inert to the light-sensitive material S, such as a fluorine series liquid. In these cases, the heating temperature is generally from 50° C. to 100° C., and preferably from 60° C. to 95° C.

Figure 2:
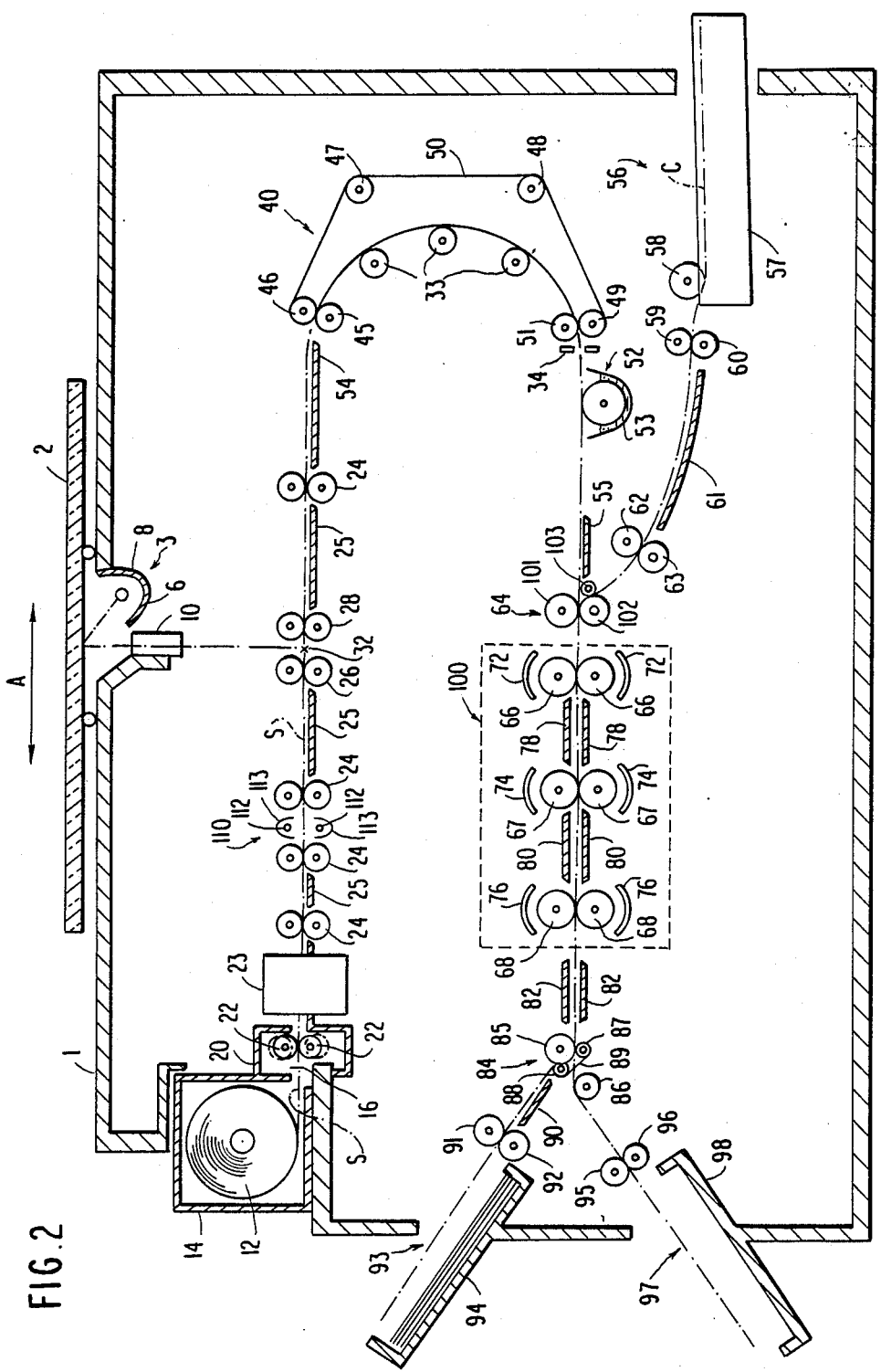
FIG. 2 illustrates a second embodiment of the duplicating apparatus of this invention.

FIG. 2 is a schematic cross-sectional view showing another example of the duplicating apparatus of this invention equipped with a moving original type exposure means 3.

In the duplicating apparatus, an original supporting glass plate 2 is provided on the upper face of a hosing 1 reciprocating-slidably in the direction of an arrow A. That is, an original (not shown) is placed in the glass plate 2 with imaged surface down and reciprocated in the direction of the arrow A.

Under the glass plate 2 is disposed an illumination lamp 8 equipped with a reflection mirror 6 for illuminating the original and a fiber lens array 10 for forming the image of the original on a light-sensitive material S at a definite position is also formed.

The other parts of FIG. 2 are same as those of FIG. 1 already explained. The duplicating apparatus is further equipped with an illumination lamp 8, light-sensitive material delivery rollers 22, a cutter unit 23, an original supporting glass plate 2, a sensor 34 for detecting the leading top of the light-sensitive material, and a controlling means (not shown) connected to the means 64 for superposing the image-receiving paper on the light-sensitive material and is operated as follows.

In the working standby step, i.e., the copying standby step of the duplicating apparatus, the leading top of the light-sensitive material S is in the magazine connecting dark box 20.

Then, when a copy start buttom (not shown) is pushed, the delivery rollers 22 act to advance the light-sensitive material S. After, if necessary, applying overall exposure to the light-sensitive material in the overall exposure means 110, the illumination lamp 8 is lighted directly before the leading edge of the light-sensitive material reaches the position 32 to illuminate the original. Also, when the leading edge reaches position 32, the original supporting glass plate 2 moves and the light-sensitive material S is moved corresponding to the movement of the original, whereby the image of the original is projected onto the light-sensitive material S to finish the imagewise exposure. When the light-sensitive material S is advanced to the same length as the length of the original in the moving direction, the cutter unit 23 acts to cut the light-sensitive material S. Thereafter, the delivery rollers 22 are rotated to move back the light-sensitive material S so that the leading top of the light-sensitive material S is in the dark box 20.

Thereafter, the apparatus is operated as the case of the duplicating apparatus shown by FIG. 1.

In these two embodiments of this invention, the image exposure is carried out by a slit imagewise exposure of the moving exposure means type or the moving original type but the invention is not limited to these types and, for example, the whole surface of the original may be illuminated to project the image on the light-sensitive material in a rest state.

Also, in the aforesaid embodiments, the light-sensitive material S is cut by the cutter unit 23 at each exposure but the cutter unit 23 may be omitted by disposing a winding roll in place of the discarding box 94.

Furthermore, in place of a rolled light-sensitive material, sheet-form light-sensitive materials previously cut into definite length can be used. In this case, the cutter unit is omitted.

Also, in place of using sheet-form image-receiving papers, a rolled image-receiving paper may be used, and in this case a cutter unit for cutting the image-receiving paper to a definite length is disposed in front of the image-receiving paper supplying means.

Furthermore, in these two embodiments of this invention, the light-sensitive material S is imagewise exposed after the uniform overall exposure but the overall exposure may be applied during the imagewise exposure or after the imagewise exposure and before the superposing step. That is, the overall exposure may be applied at any time before the superposing step.

In addition, in the aforesaid embodiments, the overall exposure for the light-sensitive material S can be applied from either the support side or the light-sensitive layer side thereof, and hence the support for the light-sensitive material S is preferably transparent but may not be transparent if it is not light-shielding.

Furthermore, in these two embodiments, a controlling means (not shown) for controlling the exposure amount of the overall exposure means 110 (e.g., a switch for controlling the exposure time) is provided to control the extent of softening the gradation of the light-sensitive material.

Figure 3:
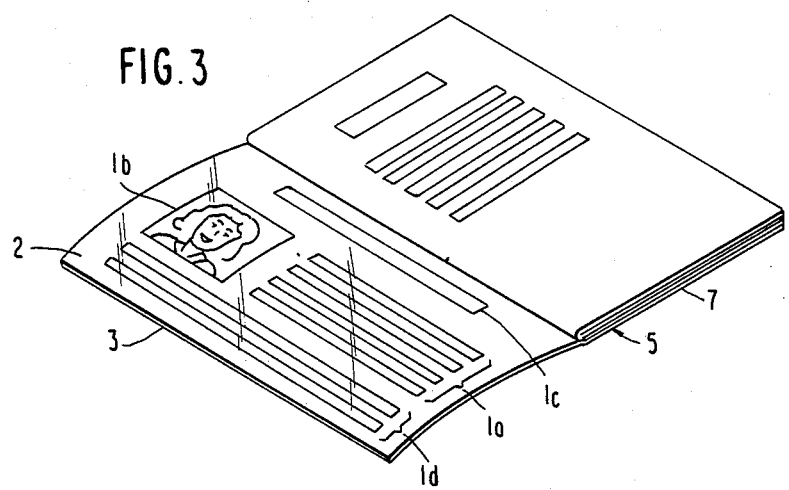
FIG. 3 is a view showing a machine readable passport (MRP) to which the invention is applied.
Figure 4:
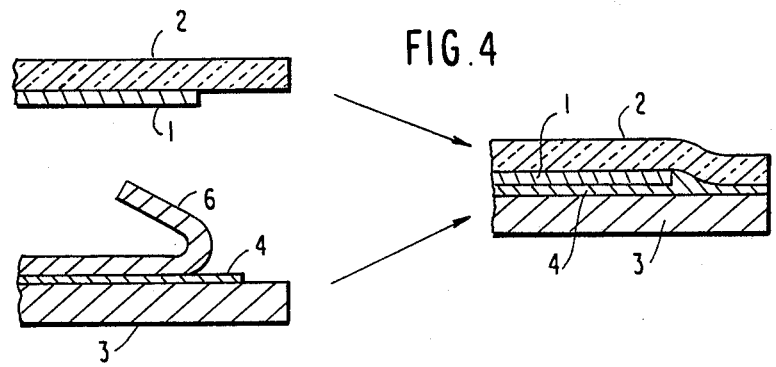
FIG. 4 is a schematic sectional view of the main portions showing the manner of making an MRP and the layer structure of a MRP in an example of this invention.
Figure 5:
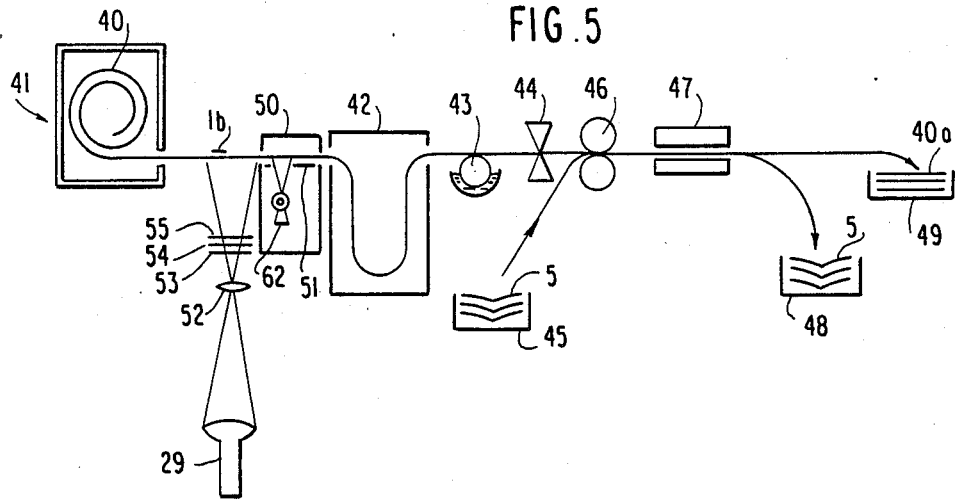
FIG. 5 is a schematic view showing a video printer.

The image-forming process of this invention is suitable for making a machine readable passport (MPA) as shown in FIG. 3 to FIG. 5.

The MPA shown in FIG. 3 is composed of a booklet 5 having a transparent sheet 2 having on one surface an image-receiving layer 1 having transferred thereon a composite of a letter image 1a, a portrait 1b, a figure image 1c and an OCR image 1d; a support sheet 3 disposed at the opposite side of the transparent sheet 2 to the image-receiving layer side; and an adhesive layer 4 formed on the support sheet 3 at the transparent sheet facing side for adhering the support sheet 3 and the transparent sheet 2. The transparent sheet 2 and support sheet 3 are filed in the booklet 5 at the position of superposing the sheets 2 and 3 on each other. Also, in the booklet 5 are further filed register sheets 7 for stamping emigration and immigration stamps, visas stamps, etc.

The aforesaid image-receiving layer 1 has composite images of a letter image 1a, a portrait 1b, a figure image 1c, and an OCR image 1d transferred thereon. As shown in FIG. 2, the image-receiving layer 1 having the composite images transferred thereon and the transparent sheet 2 having the layer 1 adhered thereto are adhered to the support sheet 3 through the adhesive layer 4, whereby the transparent sheet 2, the image-receiving layer 1, the adhesive layer 4, and the support sheet 3 are integrated in a body to provide a 4-layer structure composite sheet as a front cover paper in the booklet 5.

The image-receiving layer 1 is formed on the support sheet 3 side surface of the transparent sheet 2 at a thickness of about 10 $\mu$m. On the image-receiving layer 1 have been recorded by transfer a letter image 1a such as a name, a portrait 1b, if necessary, a figure image 1c, and an OCR image of optically readable characters 1d.

Printing of the images 1a to 1d onto the image-receiving layer 1 is performed by first arranging the aforesaid images 1a to 1d by a computer considering the dispositions thereof (layout), displaying the composite image on a CRT (cathode ray tube) for printing, exposing the image on a heat-developable light-sensitive material by, for example, a three-color successive exposure system, and then heat-developing the exposed heat-developable light-sensitive material and transferring the image formed onto the image-receiving layer simultaneously therewith.

The adhesive layer 4 is formed on the back side of the support sheet 3, i.e., the transparent sheet side and adheres the support sheet to the transparent sheet so that the image-receiving layer 1 of the transparent sheet is in close contact with the back side surface of the support sheet 3. For the image-receiving layer, an adhesive which does not attack the images 1a to 1d heat-transferred onto the iamge-receiving layer 1 and does not form bubbles between the sheets 2 and 3 is selected and is coated thereon at a thickness of, e.g., from 1 $\mu$m to 200 $\mu$m. In addition, the adhesive layer 4 is formed at the transparent sheet side of the support sheet 3 in this embodiment but the invention is not limited to such an embodiment and, for example, after transferring the image onto the image-receiving layer 1, the adhesive layer may be formed thereon by coating. Furthermore, a separate adhesive sheet may be used and further an adhesive sheet formed on a releasable paper may be used.

On the adhesive layer 4 is provided a releasable paper 6. The releasable paper 6 is a little larger than the support sheet to an extent that the border portion of the releasable paper 6 extends over the border of the support sheet 3 so that the pheriphey of the releasable paper can be easily held for releasing the releasable paper 6. In addition, if the larger size of the releasable paper 6 than the adhesive layer 4 causes inconvenience by the protrusion of the border portions of the releasable paper 6 over the booklet 5, the size of the releasable paper 6 may be reduced to the same size as or smaller than the size of the support sheet, but not smaller than the adhesive layer.

Then, by referring to FIG. 5, the manner of preparing the MRP is explained.

The step of exposing the images, such as the letter image 1a, the portrait 1b, etc., (FIG. 3) is performed by a printer video as shown in FIG. 5.

As shown in FIG. 5, the video printer is equipped with a cassette 41 for a roll having wound thereon a heat-developable light-sensitive paper 40, printing CRT 29 for exposing a composite image on the emulsion surface of the light-sensitive paper 40 withdrawn from the cassette 41, an aperture 51 having an opening at the position and of a size matching to a portrait exposed zone 1b of the light-sensitive paper thus exposed, an overall exposure light source 62, a looper means 42 for storing the exposed light-sensitive paper 40 in a loop form for smoothly performing the subsequent processing, a water supplying means 43 disposed in front of the looper means 42 for uniformly applying water onto the emulsion layer of the light-sensitive material 40 as a diffusion aid for facilitating the heat transfer in the subsequent step, a cutter 44 disposed in front of the water supplying means 43 for cutting the exposed light-sensitive paper 40 into frames, a case 45 containing the booklets 5 before they are laminated to the frames disposed in the case 45 such that the image-receiving layer 1 is facing upward, a pair of rollers 46 for matching the superposing position of the image-receiving layer 1 of each booklet transferred from the case 5 and the cut light-sensitive paper 40 and withdrawing air, between the superposed light-sensitive paper 40 and the image-receiving layer 1 of the booklet 5, a heat developing and image-transferring section 47 for sandwiching the superposed image-receiving layer 1 and the light-sensitive paper 40 in the perpendicular direction and applying heat thereto to perform the heat development and image transfer, a booklet case 48 for receiving the heat-transferred sensitive box 49 for collecting the waste light-sensitive papers 40a after heat transfer.

The aforesaid CRT 29 for printing is disposed such that a composite image of a portrait, letter images, and other images is focused onto the light-sensitive paper 40 based in the outputs from an image compositing means (not shown) to expose the light-sensitive paper 40. That is, a black-and-white image corresponding to the blue composite image, a black-and-white image corresponding to the green composite image, and a black-and-white image corresponding to the red composite image are successively displayed on CRT 29 for printing and they are exposed to the light-sensitive paper 40 through a lens 52. The three-color face successive exposures are performed by selectively inserting each of a blue filter 53, a green filter 54, and a red filter 55 by means of a filter changing means (not shown) to convert each black-and-white image described above into a monochromic image of blue, green, or red.

In addition, in place of the exposure of the light-sensitive paper 40 by the CRT 29 the exposure may be performed using an LED (light emitting diode), laser or FOT.

At the exposure of the aforesaid light-sensitive paper 40, the light-sensitive paper 40 is intermittently advanced by frame by means of a frame advancing means (not shown). The light-sensitive paper 40 thus advanced by frame and image-exposed successively is subjected to an overall exposure of a definte exposure amount by the overall exposure light source 52 through the aperture 51 having an opening disposed at the same position as the exposure zone for a portrait and the same size as that of the portrait in an overall exposure means 50. Furthermore, after passing through the looper means 42, the light-sensitive paper 40 is uniformly coated with water thinly at the emulsion layer side of the light-sensitive paper by means of the water-supplying means 43. The water thus supplied acts as a diffusion aid in the heat-development and image-transfer step. In addition, fusible, urea, water of crystallization, water-containing microcapsules, which form water by heating, can be included in the image-receiving layer 1 as a diffusion aid during the preparation of the image-receiving layer, and the application of water in the superposing step is unnecessary.

The light-sensitive paper 40 thus applied with water is cut into frames by means of the cutter 44, transferred to a definite position by a transfer means (not shown), and superposed on the image-receiving layer 1 of the booklet 5 transported from the cassette 45. Thereafter, the water applied in the previous step is uniformly spread over the emulsion layer of the light-sensitive paper by means of a pair of squeeze rollers 46.

Then, the booklet 5 thus superposed on the image-receiving layer 1 of the light-sensitive paper 40 of one frame is heated by means of the heat-development and image-transfer means composed of an upper heat plate and a lower heat plate 47 and dyes in the light-sensitive emulsion layers of the light-sensitive paper 40 are heat-transferred onto the image-receiving layer 1 of the booklet 5. In addition, since the heat-developing and image transfer step has a longer processing time than other steps, it is preferred that the heat-development and image-transfer portion 47 is composed of plural stages that are used in parallel. By employing such plural stages, the processing efficiency of the video printer can be improved. After heat-development and image transfer, the waste light-sensitive papers 40 collected in the box 49, and the booklets 5 after heat transfer are collected in the case 48.

The step of making a sheet-form product such as an identity car (ID card) is explained with reference to FIG. 6 and FIG. 7.

Figure 6:
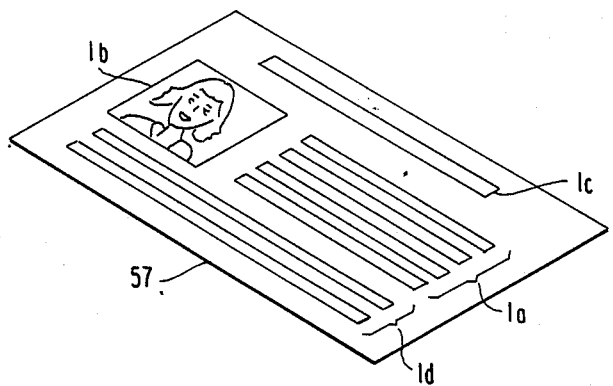
FIG. 6 is a view showing an original which is used for the process of this invention.

FIG. 6 shows an original having printed personal information 1a, 1c, and 1d and a portrait 1b attached thereto. An original 57 is placed on an original stand 58 of an image copying device shown in FIG. 7. Then, a heat-developable light-sensitive paper 40 is withdrawn from a cassette 41. The original 57 is focused onto the light-sensitive paper 40 by a lens 52 for exposure.

Also, color filters and a diaphragm for controlling color balance and exposure time for the light-sensitive paper 40 are set in an exposure condition controlling means 59 and the conditions are changed as required. Then, by illuminating the original 57 by lamps 56, the image of the original is exposed on the light-sensitive paper 40. Thereafter, the light-sensitive paper 40 is sent to the overall exposure section 50 one frame at a time, wherein an overall exposure of a definite exposure amount is applied to the light-sensitive paper 40 by the side exposure light source 62 through the an aperture 51 having the opening disposed at the position corresponding to the exposed position of the portrait on the light-sensitive paper 40 and having the same size as that of the exposed portion of the portrait.

Then, the light-sensitive paper 40 is sent to superposing rollers 46 through a looper means 42, a water supplying means 43, and a cutter 44.

An image-receiving sheet 60 is supplied from a cassette 45 and is superposed on the light-sensitive paper 40 by the superposing rollers 46 so that the light-sensitive layer of the light-sensitive paper is in face-to-face relationship with the image-receiving layer of the image-receiving sheet 60. In this embodiment, the image-receiving sheet 60 is not filed in a booklet but is finished as a single sheet composed of a transparent or translucent support having formed thereon the image-receiving layer having the aforesaid composite image heat-transferred.

The subsequent procedures are same as those described above for FIG. 5.

Thus, the sheets 60 having the images of the original are collected in a case 48.

Figure 7:
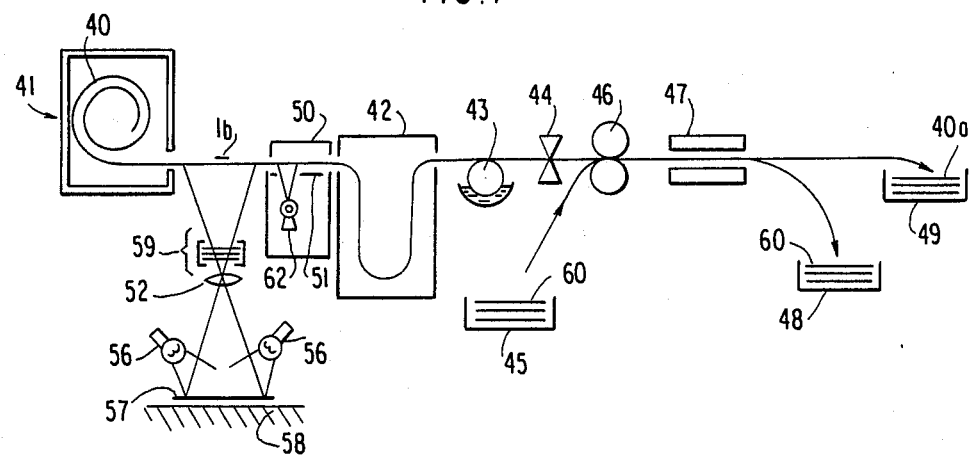
FIG. 7 is a schematic view showing an image duplicating apparatus.

In the embodiments illustrated by FIG. 5 and FIG. 7, the overall exposure is applied after the image exposure, but the overall exposure may be applied before the image exposure in this invention.

Thus, according to this invention, the gradation of positive images obtained can be stably controlled in a simple manner without need of complicated operations.

The invention is now explained in greater detail with reference to the following specific examples, but the present invention is not to be construed as being limited thereto. Unless otherwise indicated all parts, percents and ratios are by weight.

EXAMPLE 1

A silver halide emulsion for layer 1 was prepared as follows.

To an aqueous gelatin solution (a solution of 20 g of gelatin and 3 g of sodium chloride in 1000 ml of water kept at 75° C.) while stirring well were simultaneously added 600 ml of an aqueous solution containing sodium chloride and potassium bromide and an aqueous silver nitrate solution (a solution of 0.59 mol of silver nitrate in 600 ml of water) at an equal flow rate over a period of 40 minutes to provide a mono-disperse cubic silver chloride emulsion (bromine 80 mol %) having a mean grain size of 0.35 μm.

After washing the emulsion with water and desalting, the emulsion was chemically sensitized with the addition of 5 mg of sodium thiosulfate and 20 mg of 4-hydroxy-6-methyl-1,3,3a,7-tetraazaindene at 60° C. The amount of the emulsion obtained was 600 g.

The silver halide emulsion for layer 3 was prepared as follows.

To an aqueous gelatin solution (a solution of 20 g of gelatin and 3 g of sodium chloride in 1000 ml of water kept at 75° C.) were simultaneously added 600 ml of an aqueous solution of sodium chloride and potassium bromide, an aqueous silver nitrate solution (a solution of 0.59 mol of silver nitrate in 600 ml of water), and a dye solution (I) shown below at an equal flow rate over a period of 40 minutes to provide a mono-disperse cubic silver chlorobromide emulsion (bromine 80 mol %) having a mean grain size of 0.35 μm adsorbed with the dye.

After washing with water and desalting, the emulsion was chemically sensitized with the addition of 5 mg of sodium thiosulfate and 20 mg of 4-hydroxy-6-methyl-1,3,3a,7-tetraazaindene at 60° C. The amount of emulsion obtained was 600 g.

Dye Solution (I):

| | |
|---|---|
| Dye of the following structure 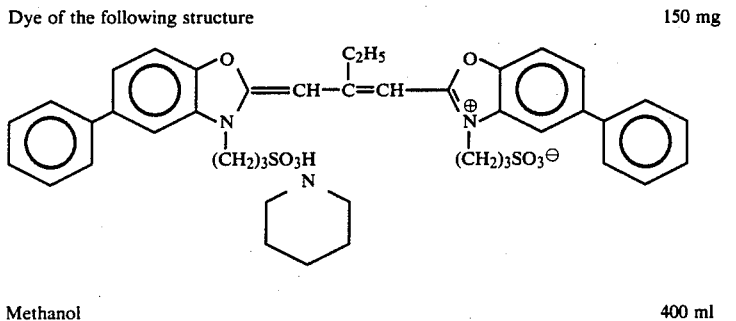 | 150 mg |
| Methanol | 400 ml |

Then, the silver halide emulsion for layer 5 was prepared as follows.

To an aqueous gelatin solution (a solution of 20 g of gelatin and ammonia in 1000 ml of water kept at 50° C.) while stirring well were simultaneously added 1000 ml of an aqueous solution of potassium iodide and potassium bromide and an aqueous silver nitrate solution (a solution of 1 mol of silver nitrate in 1000 ml of water) at a constant pAg to provide a mono-disperse octahedral silver iodobromide emulsion (iodine 5 mol %) having a mean grain size of 5 μm.

After washing with water and desalting, the emulsion was subjected to gold and sulfur sensitization with the addition of 5 mg of chloroauric acid (tetrahydrate) and 2 g of sodium thiosulfate at 60° C. The amount of the emulsion obtained was 1 kg.

Then, a gelatin dispersion of a dye-providing material was prepared as follows.

In 46 ml of cyclohexanone were dissolved 18 g of a yellow dye-providing material A-1 (shown below), 9 g of an electron donating material (reducing agent) B (shown below) and 9 g of tricyclohexyl phosphate at about 60° C. to provide a homogeneous solution. After mixing the solution with 100 g of an aqueous solution of 10% limited gelatin and 1.5 g of sodium dodecylbenzenesulfonate with stirring, the mixture was dispersed by a homogenizer for 10 minutes at 10,000 r.p.m, to provide a yellow dye-providing material dispersion.

Dispersions of magenta and cyan dye-providing materials were prepared in the same manner as for preparing the yellow dye-providing material dispersion, using a magenta dye-providing material A-2 and cyan dye-providing material A-3, respectively.

A multilayer color photographic material 101 having the layers of the compositions shown below was prepared using these products.

A-1

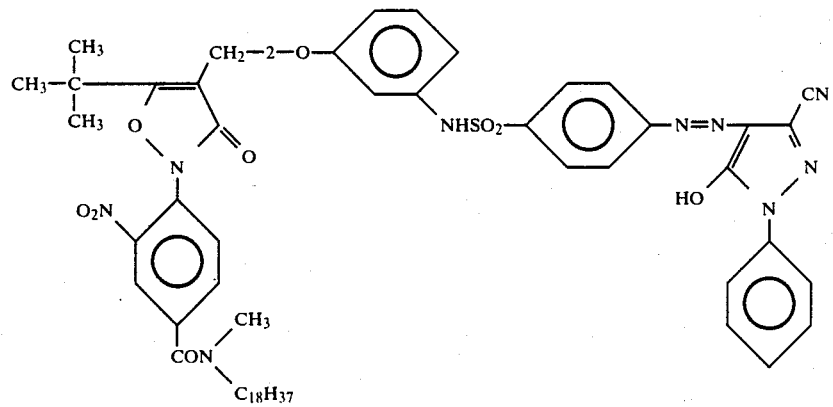

-continued

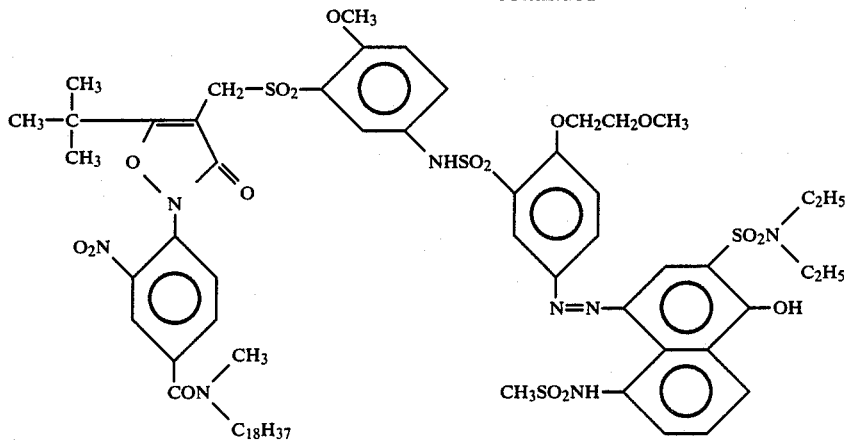
A-2

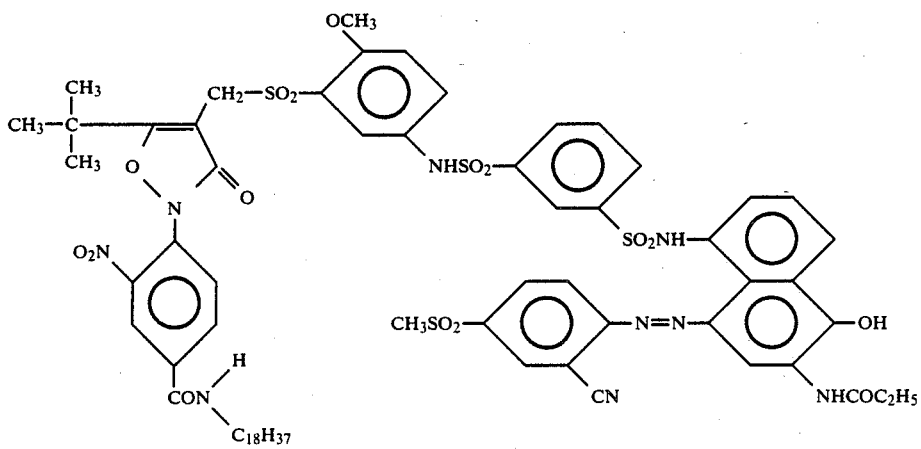
A-3

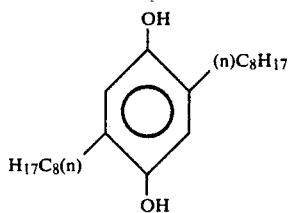
B

Layer Construction

A polyethylene terephthalate film having a thickness of 100 μm was used as the support.

| Layer 1 Red-sensitive Emulsion Layer | |
| --- | --- |
| Silver chlorobromide emulsion | 400 mg/m² |
| (bromine 80 mol %) | as Ag |
| Sensitizing dye (*3) | 8 × 10⁻⁷ mol/m³ |
| Cyan dye-providing material (A-3) | 300 mg/m² |
| Gelatin | 1000 mg/m² |
| Electron donating material (B) | 150 mg/m² |
| High boiling solvent (*4) | 150 mg/m² |
| Antifoggant (*10) | 1.1 mg/m² |
| 1,5-Diphenyl-3-pyrazolidone | 60 mg/m² |
| Surface active agent (*2) | 100 mg/m² |
| Layer 2 Interlayer | |
| Gelatin | 800 mg/m² |
| Zinc hydroxide (size 0.2 μm) | 400 mg/m² |
| Reducing agent (*8) | 500 mg/m² |
| Layer 3 Green-Sensitive Emulsion Layer | |
| Silver chlorobromide emulsion | 400 mg/m² |
| (bromide 80 mol %) | as Ag |
| Magenta dye-providing material (A-2) | 400 mg/m² |
| Gelatin | 1000 mg/m² |
| Electron donating material (B) | 200 mg/m² |
| High boiling solvent (*4) | 200 mg/m² |
| 1,5-Diphenyl-3-pyrazolidone | 60 mg/m² |
| Surface active agent (*2) | 100 mg/m² |
| Antifoggant (*10) | 1.1 mg/m² |
| Layer 4 Interlayer | |
| Gelatin | 800 mg/m² |
| Zinc hydroxide (size 0.2 μm) | 400 mg/m² |
| Reducing agent (*8) | 500 mg/m² |
| Layer 5 Blue-Sensitive Emulsion Layer | |
| Silver iodobromide emulsion | 500 mg/m² |
| (bromine 5 mol %) | as Ag |
| Yellow dye-providing material (A-1) | 400 mg/m² |
| Gelatin | 1000 mg/m² |
| Electron donating material (B) | 200 mg/m² |
| High boiling solvent (*4) | 200 mg/m² |
| 1,5-Diphenyl-3-pyrazolidone | 60 mg/m² |
| Surface active agent (*2) | 100 mg/m² |
| Antifoggant (*10) | 1.1 mg/m² |
| Layer 6 Protective Layer | |
| Gelatin | 800 mg/m² |
| Hardening agent (*6) | 100 mg/m² |
| Silica gel (size 4 μm) | 100 mg/m² |

-continued

Sumika ® Gel L-5H (*9)        220 mg/m²

The compounds used were as follows.

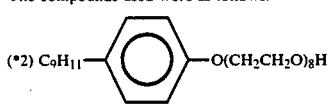
(*2) C₉H₁₁—⟨ ⟩—O(CH₂CH₂O)₈H

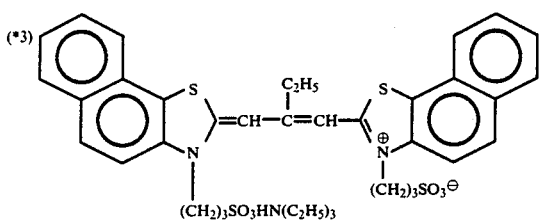
(*3) ... (CH₂)₃SO₃HN(C₂H₅)₃ ... (CH₂)₃SO₃⁻

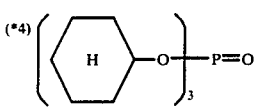
(*4) [⟨H⟩—O]₃P=O (*6) 1,2-Bis(vinylsulfonylacetamido)ethane
(*8) Sodium pentadecylhydroquinonesulfonate
(*9) Silica gel made by Sumitomo Chemical Co., Ltd.

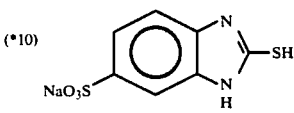
(*10) benzothiazole-SH, NaO₃S substituent

Then, a dye-fixing material was prepared as follows.

In 1300 ml of water were dissolved 63 g of gelatin, 100 g of the mordant shown below, and 80 g of picolinic acid guinidine and the solution was coated on a paper support laminated with polyethylene at a wet thickness of 45 μm followed by drying.

Mordant:

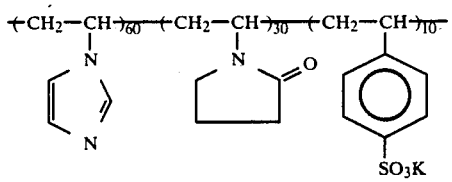
-(-CH₂—CH-)₆₀-(-CH₂—CH-)₃₀-(-CH₂—CH-)₁₀- molecular weight

Then, a solution of 35 g of gelatin and 1.05 g a hardening agent, 1,2-bis(vinylsulfonylacetamido)ethane dissolved in 800 ml of water was coated on the aforesaid layer at a wet thickness of 17 μm followed by drying to provide a dye-fixing material.

The multilayer color photographic material 101 was exposed through color separation filters of blue, green, red, and grey each having continuously changing density using a tungsten lamp for 1/10 sec. at 2000 lux. The light-sensitive material had the characteristics that the exposure amount required to provide a minimum density +0.02 was 1/10 sec. at 2000 lux.

Then, after applying 15 ml/m² of water to emulsion layer surface of the color photographic material thus exposed by a wire bar, the dye-fixing material was superposed on the photographic material so that the coated layer was in contact with the emulsion layer.

Then, the assembly was heated for 20 seconds using heat rollers the temperature of which was controlled so that the temperature of the water-impregnated layer became 85° C. Thereafter, the dye-fixing material was peeled off from the photographic material, whereby clear images of blue, green, red, and grey were obtained on the dye-fixing material corresponding to the color separation filters of blue, green, red, and grey. -This sample was designated Sample 101A.

Then, additional samples of the photographic material 101 was exposed as above for 1/10 sec. at 2000 lux, and thereafter an overall exposure was also provided while changing the uniform exposure conditions as shown in Table 1 below. By changing the kind of ND filter (neutral density filter) (made by Fuji Photo Film Co., Ltd.), each sample was processed as in the case of Sample 101A to provide Samples 101B to 101F.

The gamma values and Dmax and Dmin of each sample were measured and the results are shown in Table 1.

TABLE 1

| Sample | ND Filter Under Uniform Exposure Condition (2000 Lux. × 1/10 sec.) | | Gamma Value | Dmax | Dmin |
|---|---|---|---|---|---|
| 101A | No Uniform exposure | Y | 2.2 | 2.01 | 0.18 |
|  |  | M | 2.1 | 2.10 | 0.16 |
|  |  | C | 2.2 | 2.14 | 0.16 |
| 101B | ND 2.3** | Y | 2.15 | 2.01 | 0.18 |
|  |  | M | 2.08 | 2.10 | 0.16 |
|  |  | C | 2.10 | 2.15 | 0.16 |
| 101C | ND 2.0 | Y | 2.0 | 2.02 | 0.17 |
|  |  | M | 1.9 | 2.10 | 0.16 |
|  |  | C | 2.0 | 2.14 | 0.16 |
| 101D | ND 1.7 | Y | 1.7 | 2.02 | 0.18 |
|  |  | M | 1.65 | 2.05 | 0.16 |
|  |  | C | 1.7 | 2.12 | 0.16 |
| 101E | ND 1.5 | Y | 1.5 | 2.00 | 0.17 |
|  |  | M | 1.4 | 2.00 | 0.16 |
|  |  | C | 1.4 | 2.10 | 0.16 |
| 101F | ND 1.3 | Y | 1.25 | 1.95 | 0.15 |
|  |  | M | 1.2 | 1.90 | 0.15 |
|  |  | C | 1.2 | 1.90 | 0.14 |

*The gamma value in Table 1, is described more fully in Shashin Kogaku no Kiso, Ginen Shashin hen (Foundation of Photographic Engineering, Silver Salt Photography), pages 389 to 392.
**If the exposure amount before using the filter is $I_o$ and the exposure amount using the filter is I, the ND number is shown by the following equation.

$$ND = -\log \frac{I}{I_o}$$

$$\left[ ND2.0 = -\log \frac{1}{100} \right]$$

From the results shown in the table, it can be seen that at ND1.3, Dmax was reduced to some extent but the gamma value changed from 2.2 to 1.2, that is, the gradation was greatly softened.

Also, another sample was subjected to the overall exposure (uniform exposure) as in Sample 101C before the wedge exposure (Sample 101G) and another sample was subjected to the overall exposure simultaneously with the wedge exposure using the same light source (Sample 101H) and these samples were processed as in the case of Sample 101A.

The results obtained for these samples are shown in Table 2 below.

TABLE 2

| Sample | | Gamma Value | Dmax | Dmin |
|---|---|---|---|---|
| 101G | Y | 2.0 | 2.02 | 0.18 |
|  | M | 1.90 | 2.05 | 0.16 |
|  | C | 2.0 | 2.15 | 0.16 |
| 101H | Y | 2.05 | 2.03 | 0.18 |
|  | M | 1.90 | 2.10 | 0.16 |
|  | C | 2.0 | 2.15 | 0.16 |

From the above results, it can be seen that the uniform exposure (overall exposure) may be applied simultaneously with, before, or after the wedge exposure. By changing the conditions of the uniform exposure (overall exposure), using the same heat-developable color photographic material, the gradation (gamma value) can be changed in a great range. This result is quite surprising, since in the field of conventional photographic materials, the gradation of the toe portion only can be softened by such uniform exposure.

EXAMPLE 2

The light-sensitive material 101 was mounted in the cartridge 14 of the image-forming apparatus shown in FIG. 1.

An original having an image of a woman's face (A-4 size) was placed on the platen portion and printed as follows.

First, printing was performed by controlling the amount of the light source 208 without applying overall exposure to obtain printed images near the original. In this case, the illuminance on the original was about 500 lux. sec.

The exposure amount of the overall exposure means 110 was controlled so that the illuminance thereof on the surface of the photographic material became 15 lux. sec.

After applying this overall exposure the image exposure was performed as described above to obtain prints.

The results showed that when not applying the overall exposure, the details of hair could not be seen on the prints obtained and the prints were garish, but in the case of applying the overall exposure, the details of hair were seen well, the prints showed a soft finish and sufficient density.

EXAMPLE 3

In Example 2, filters 100Y and 100C made by Fuji Photo Film Co., Ltd. were mounted in front of the exposure lamp in the overall exposure means 110 and printing was performed by the same overall exposure condition and image exposure condition as in Example 2.

In this case, it was seen that in the prints finished, the hair portion became green and the magenta component only was softened in tone.

These results show that the gradation of a desired color can be controlled by changing the tone of the overall exposure condition.

For example, for softening the yellow component only, filters 100C and 100M or filters 200C and 200M may be used for the exposure lamp of the overall exposure means so that the blue component only is subjected to overall exposure. In another process, a blue filter may be used for obtaining the same effect as above.

EXAMPLE 4

Then, a heat-developable color photographic material F-1 having the same layers as in Example 1 on a polyethylene terephthalate film 100 μm thick was prepared using the above-described emulsions and dispersion.

The heat-developable photographic material was prepared in the form of roll (light-sensitive paper 40 in FIG. 5).

Image-Receiving Material

An image-recieving material R-1 was prepared by forming the following layers and back layers on a polyethylene-coated paper support 170 μm thick.

| | |
|---|---|
| Layer 1 | |
| Gelatin | 0.45 g/m² |
| Surface active agent (*4) | 0.01 g/m² |
| Polymer (*5) | 0.04 g/m² |
| Hardening agent (*9) | 0.30 g/m² |
| Layer 2 | |
| Mordant (*6) | 2.35 g/m² |
| Polymer (*7) | 0.60 g/m² |
| Gelatin | 1.40 g/m² |
| Polymer (*5) | 0.21 g/m² |
| High boiling solvent (*8) | 1.40 g/m² |
| Picolinic acid guanidine | 1.80 g/m² |
| Surface active agent (*2) | 0.02 g/m² |
| Layer 3 | |
| Gelatin | 0.05 g/m² |
| Silicone oil (*1) | 0.04 g/m² |
| Surface active agent (*2) | 0.001 g/m² |
| Surface active agent (*3) | 0.02 g/m² |
| Surface active agent (*4) | 0.10 g/m² |
| Picolinic acid guanidine | 0.45 g/m² |
| Polymer (*5) | 0.24 g/m² |
| Backing Layer 1 | |
| Gelatin | 3.25 g/m² |
| Hardening agent (*9) | 0.25 g/m² |
| Backing Layer 2 | |
| Gelatin | 0.44 g/m² |
| Silicone oil (*1) | 0.08 g/m² |
| Surface active agent (*2) | 0.002 g/m² |
| Matting agent (*10) | 0.09 g/m² |

The materials used for the image-receiving material were as follows.

(*1): Silicone Oil $$CH_3-Si(CH_3)_2-O-[Si(CH_3)_2-O]_{20}-[Si(CH_3)(CH_2)_3COOH-O]_4-Si(CH_3)_2-CH_3$$

(*2): Aerosol ® OT (*3): $C_8F_{17}SO_2N(C_3H_7)CH_2COOK$ (*4): $C_{11}H_{23}CONHCH_2CH_2CH_2N^{\oplus}(CH_3)(CH_2)_3COOH \cdot CH_2COO^{\ominus}$ (*5): Sumika ® Gel S-H, trade name of polymer made by Sumitomo Chemical Co., Ltd.

(*6): Mordant $$-(CH_2-CH)_{60}-(CH_2-CH)_{30}-(CH_2-CH)_{10}-$$
with pyridine, pyridone, and phenyl-SO₃H substituents (*7): Dextran (molecular weight 70,000)

(*8): Reofos ® 95, trade name, made by Ajinomoto Co., Inc.

(*9): $(CH_2)_4{-}(O{-}CH_2{-}CH{-}(epoxide){-}CH_2)_2$ (*10): Benzoguanamine Resin (mean particle size 15 μm)

The image-receiving material was cut into each of 6 cm×9 cm and they were placed in the case 45 as sheets 50 in FIG. 7 with the image-receiving layer facing upward.

By using these elements formed, sheet-form samples were prepared using the duplicating apparatus shown in FIG. 7.

The illuminance on the light-sensitive paper 40 is controlled according to the kind of the light-sensitive paper being used but in this example, the Dmin of the light-sensitive paper 40 was a minimum at an illuminance of 10 lux·sec. Therefore, a white paper was placed on surface 58 and the exposure condition controlling means 59 was controlled so that the illuminance was 15 lux·sec. on the light-sensitive paper 40.

Then, the new light-sensitive paper was pulled out from the cassette, an original was placed on the original stand 58, and an image exposure was performed.

Thereafter, without applying overall exposure thereto, water was applied on the light-sensitive paper 40 by the water supplying means 43 at 15 g/mz, the image-receiving sheet 60 was placed on the light-sensitive paper 40 by the superposing rollers 46, and the assembly was heated to 88° C. for 15 seconds by the heat-developing and image-transfer section 47. Then, the light-sensitive paper 40 was peeled off from the sheet 60 having the transferred image to give Sample R101.

By following the same procedure as above except that after image exposure, the exposed portion of the portrait only was exposed in the overall exposure section at 0.1 lux·sec., 0.3 lux sec., or 1.5 lux·sec., Sheet Samples R102, R103, and R104, respectively were prepared.

In Sample R101, the image tone of the portrait was hard and the image obtained was inferior to the original.

In Sample R102, the tone of the image of the portrait was considerably soft and the image obtained was near the original and in sample R103, the image obtained was almost the same as the original.

In Sample R104, the tone of the image of the portrait was too soft to give a satisfactory finish.

In addition, in Samples R101 to R104, the reproducibility of other images than the image of the portrait (e.g., letter image, figure image, OCR image) was very good in each case. (In addition, the gamma of the light-sensitive paper used in the example was 2.2).

Thus, it can be understood that it is possible to improve the quality of a finished image of a photographic image (continuous tone image) by softening the gradation of the light-sensitive paper itself without need of overall exposure, but in such a case the reproduction of discontinuous tone portions such as letters or figures, is reduced. Hence it is preferred to harden the gradation of the light-sensitive paper itself to some extent for improving the reproduction of discontinuous tone portions and to improve the tone reproduction of a continuous tone portion such as a portrait by applying an overall exposure to the portrait portion only as in this invention.

While the invention has been described in detail and with reference to specific embodiments thereof, it will be apparent to one skilled in the art that various changes and modifications can be made therein without departing from the spirit and scope thereof.

What is claimed is:

1. A method for forming an image by the steps of:
   (a) imagewise exposing a heat-developing color light-sensitive material;
   (b) uniformly exposing at least a portion of the heat-developable light-sensitive material; and
   (c) heat developing the imagewise exposed and uniformly exposed heat-developable light-sensitive material to form a color image, wherein said heat-developable light-sensitive material comprises a support having thereon at least one light-sensitive silver halide emulsion layer containing silver halide grains capable of forming a surface latent image, at least one layer of said material comprising a dye-providing compound capable of imagewise releasing a diffusible dye upon heat development.

2. The method as claimed in claim 1, wherein said step of uniformly exposing said material is performed after said imagewise exposing step and prior to said heating step.

3. The method as claimed in claim 1, wherein said step of uniformly exposing said material is performed at the same time as said imagewise exposing step.

4. The method as claimed in claim 1, wherein said step of uniformly exposing said material is performed prior to said imagewise exposing step.

5. The method as claimed in claim 1, wherein said image in said imagewise exposing step comprises at least one continuous tone image and at least one discontinuous tone image, said uniform exposure being applied only to said continuous tone image portion of said material.

6. The method as claimed in claim 1, wherein the amount of said imagewise exposure is from 10 to 300 times the amount of said uniform exposure.

7. The method as claimed in claim 1, wherein the amount of said imagewise exposure is from 15 to 200 times the amount of said uniform exposure.

8. The method as claimed in claim 1, wherein the exposure time of said imagewise exposure is from 100 to 1/100 times the exposure time of said uniform exposure.

9. The method as claimed in claim 1, wherein the exposure time of said imagewise exposure is from 10 to 1/10 times the exposure time of said uniform exposure.

10. A method for forming an image by the steps of:
    (a) imagewise exposing a heat-developing color light-sensitive material;
    (b) uniformly exposing at least a portion of the heat-developable light-sensitive material; and
    (c) heat developing the imagewise exposed and uniformly exposed heat-developable light-sensitive material to form a color image, wherein said heat-developable light-sensitive material comprises a support having thereon at least one light-sensitive silver halide emulsion layer containing silver halide grains capable of forming a surface latent image, at least one layer of said material comprising a dye-providing compound capable of imagewise releasing a diffusible dye upon heat development, further comprising a step of transferring a diffusible dye image formed upon heat development in said light-sensitive material to an image-receiving material comprising a support having thereon at least one mordanting layer capable of fixing said diffusible dye.

11. The method as claimed in claim 10, wherein said step of transferring said diffusible dye comprises superposing said light-sensitive material and said image-receiving material and transferring said diffusible dye in the presence of a liquid medium.

12. The method as claimed in claim 11, wherein said liquid medium is selected from water, a high-boiling organic solvent, a hydrophilic heat solvent, and a combination thereof.

13. A method for forming an image by the steps of:
    (a) imagewise exposing a heat-developing color light-sensitive material;
    (b) uniformly exposing at least a portion of the heat-developable light-sensitive material; and (c) heat developing the imagewise exposed and uniformly exposed heat-developable light-sensitive material to form a color image, wherein said heat-developable light-sensitive material comprises a support having thereon at least one light-sensitive silver halide emulsion layer contained silver halide grains capable of forming a surface latent image, at least one layer of said material comprising a dye-providing compound capable of imagewise releasing a diffusible dye upon heat development, wherein said dye-providing compound is represented by formula (I):

$$\text{PWR}-(\text{Time})_t-\text{Dye} \quad (I)$$

wherein PWR represents a group capable of releasing (Time)$_t$—Dye upon being reduce; Time represents a group capable of releasing Dye after (Time)$_t$—Dye released from PWR; t is 0 or 1; and Dye represents a dye or a dye precursor.

14. A method for forming an image by the steps of:
(a) imagewise exposing heat-developing color light-sensitive material;
(b) uniformly exposing at least a portion of the heat-developable light-sensitive material; and
(c) heat developing the imagewise exposed and uniformly exposed heat-developable light-sensitive material to form a color image, wherein said heat-developable light-sensitive material comprises a support having thereon at least one light-sensitive silver halide emulsion layer containing silver halide grains capable of forming a surface latent image, at least one layer of said material comprising a dye-providing compound capable of imagewise releasing a diffusible dye upon heat development, wherein said light-sensitive silver halide emulsion layer comprises from 0.01 to 10 mols of an organic silver salt per mol of said light-sensitive silver halide.

15. The method as claimed in claim 5, wherein said discontinuous tone image comprises substantially uniformly black written characters or lines.

16. The method as claimed in claim 15, wherein said discontinuous tone image comprises at least one of written characters, printed characters, machine-readable characters and bar codes.

* * * * *